United States Patent
Curran et al.

(10) Patent No.: US 12,275,173 B2
(45) Date of Patent: Apr. 15, 2025

(54) POROUS OXIDE FOR IMPROVED TITANIUM-POLYMER BONDING

(71) Applicant: Apple Inc., Cupertino, CA (US)

(72) Inventors: James A. Curran, Sunnyvale, CA (US); James A. Yurko, Saratoga, CA (US); Todd S. Mintz, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/656,395

(22) Filed: Mar. 24, 2022

(65) Prior Publication Data

US 2023/0092781 A1    Mar. 23, 2023

Related U.S. Application Data

(60) Provisional application No. 63/261,412, filed on Sep. 20, 2021.

(51) Int. Cl.
| | |
|---|---|
| *B29C 45/14* | (2006.01) |
| *B29C 45/00* | (2006.01) |
| *B29K 67/00* | (2006.01) |
| *B29K 71/00* | (2006.01) |
| *C22C 14/00* | (2006.01) |
| *C23C 22/78* | (2006.01) |
| *C23C 22/83* | (2006.01) |

(52) U.S. Cl.
CPC .... *B29C 45/14311* (2013.01); *B29C 45/0001* (2013.01); *C22C 14/00* (2013.01); *C23C 22/78* (2013.01); *C23C 22/83* (2013.01); *B29K 2067/003* (2013.01); *B29K 2071/00* (2013.01)

(58) Field of Classification Search
None
See application file for complete search history.

(56) References Cited

U.S. PATENT DOCUMENTS

| | | | | |
|---|---|---|---|---|
| 4,759,965 | A | * | 7/1988 | Kato ............... C04B 41/0072 428/209 |
| 2003/0136547 | A1 | * | 7/2003 | Gollan ............... F28F 1/124 165/104.21 |

(Continued)

FOREIGN PATENT DOCUMENTS

| | | | | | |
|---|---|---|---|---|---|
| CN | 103159238 | A | * | 6/2013 | |
| EP | 407349 | A | * | 1/1991 | ............. C23C 26/00 |

(Continued)

OTHER PUBLICATIONS

Du, et al., "Chlor-Alkali Process Engineering", Jul. 31, 1990, 88-89.

(Continued)

*Primary Examiner* — Tamra L. Dicus
(74) *Attorney, Agent, or Firm* — Dorsey & Whitney LLP

(57) ABSTRACT

A chemical treatment process has been identified as a simple and effective means of improving the bonding of injection-molded polymer to titanium surfaces. This process forms an oxide layer on a titanium surface that includes a layered double hydroxide. The layered double hydroxide both raises the bond strength and minimizes air or water leakage. The process enables the use of titanium alloys with injection molded polymer structural bonds in strong, lightweight, and water-resistant enclosures for consumer electronics.

7 Claims, 7 Drawing Sheets

(56) References Cited

U.S. PATENT DOCUMENTS

| | | | |
|---|---|---|---|
| 2015/0079298 A1* | 3/2015 | Ferreira | C23C 22/12 |
| | | | 423/595 |
| 2016/0141582 A1* | 5/2016 | Fujisaki | H01M 50/403 |
| | | | 427/532 |
| 2019/0123322 A1* | 4/2019 | Yamamoto | B32B 9/00 |

FOREIGN PATENT DOCUMENTS

| | | | | |
|---|---|---|---|---|
| JP | 2017122283 A * | 7/2017 | | C23C 16/02 |
| KR | 102213671 B1 * | 2/2021 | | |
| WO | WO-2015098610 A1 * | 7/2015 | | H01M 2/145 |
| WO | 2021119373 A1 | 6/2021 | | |
| WO | 2021119514 A1 | 6/2021 | | |
| WO | WO-2021119371 A1 * | 6/2021 | | B32B 15/02 |

OTHER PUBLICATIONS

Tummala, Raor., "Series Books of Key Technologies for Semiconductors and Integrated Circuits: Fundamentals of Device and Systems Packaging: Technologies and Applications, 2nd edition", Jun. 30, 2021, 203.

* cited by examiner

POROUS OXIDE FOR IMPROVED TITANIUM-POLYMER BONDING

CROSS-REFERENCE TO RELATED APPLICATION(S)

This application claims the benefit of U.S. Provisional Patent Application No. 63/261,412, filed 20 Sep. 2021, entitled "POROUS OXIDE FOR IMPROVED TITANIUM-POLYMER BONDING," the disclosure of which is incorporated herein by reference in its entirety.

FIELD

The described embodiments relate generally to surface structures on a titanium surface. More particularly, the present embodiments relate to systems and methods for forming interlocking structures at a titanium surface for attaching a polymer material to the titanium surface.

BACKGROUND

Enclosures for consumer devices are typically constructed from a combination of metal and non-metal materials in order to provide functional, structural, and cosmetic enhancements. However, metals that exhibit characteristics favorable to use in consumer devices, such as titanium, may lack a natural ability to attach to these non-metal materials. Techniques for modifying the metal in order to facilitate attachment to the non-metal material can require a considerable amount of time, expense, and effort. Furthermore, despite being able to attach the non-metal material to the metal material, these techniques may be unable to provide the necessary amount of pull strength between the titanium and the non-metal material.

Additionally, certain metals can be etched and/or anodized to provide improved adhesion; however, no comparable processes exist for titanium. State-of-the-art etching and surface treatment processes for titanium (such as those used for Osseo-integration of medical implants and high surface area catalysts) generate only scalloped textures—not undercut or sponge-like textures. Unlike aluminum and/or steel anodizing, titanium anodizing typically yields non-porous oxides, which do relatively little to improve polymer adhesion. Porous oxides can be formed on titanium by micro-arc oxidation, or by anodizing in fluoride-based electrolytes, and by anodizing in caustic solutions, but such oxides are themselves generally friable and/or poorly adhered, doing little to promote adhesive bonding of injection molded structural polymers.

SUMMARY

This paper describes various embodiments that relate to an oxide developed on a titanium surface. Further, this paper includes embodiments that relate to techniques for etching a surface of a metal part that includes titanium. In particular, the various embodiments relate to systems and methods for forming interlocking structures at the surface of the titanium part for attaching a polymer material to the surface of a metal part that includes titanium.

According to some embodiments, an oxide layer on a titanium surface can include a layered double hydroxide. In some examples, the titanium surface includes a titanium alloy. In some embodiments, the oxide layer includes a thickness of about 30 nm to about 70 nm. The oxide layer can include a porosity between about 30% and about 80%, in some examples. In some examples, the layered double hydroxide includes a microstructure including a plate less than about 10 nm in thickness and about 10 to about 100 nm in length having an angle from about 30° to about 90° to the titanium surface. In some examples, the oxide layer can include a first plate and a second plate. A terminal end of the first plate can be a distance between about 20 nm and about 80 nm from a terminal end of the second plate. The oxide layer can further include a porous structure wherein a pore of the porous structure includes a diameter from about 20 to about 50 nm.

According to some embodiments, a titanium-polymer interface can include an oxide layer on a titanium surface and a polymer. In some examples, the oxide layer and the polymer can form a titanium-polymer bond comprising a bond strength of about 28 MPa or greater. In some embodiments, the oxide layer can include a layered double hydroxide. In some examples, the polymer can include at least one of a glass-filled PBT resin, a polyamide, and an epoxy.

In some examples, the titanium surface can include a chemically etched surface. The chemically etched surface can be etched with sulfuric acid. In some examples, the polymer can include an injection-molded polymer. In some examples, the titanium-polymer interface can include a polymer comprising a dynamic viscosity from about 100 cps to about $1 \times 10^6$ cps.

According to some embodiments, a porous oxide layer formed on a titanium surface can include a plate about 10 to about 100 nm in length extending from the surface oxide layer to a terminal end of the plate. In some examples, the porous oxide layer can include a first plate and a second plate. A terminal end of the first plate can be a distance of between about 20 nm to about 80 nm to a terminal end of the second plate. In some examples, the porous oxide layer can include a thickness between about 30 nm and about 70 nm. In some examples, the oxide layer can include a porosity between about 30% and about 80%. In some embodiments, the plate can include a thickness of about 10 nm. In some examples, the plate can be angled from about 30° to about 90° relative to the titanium surface.

Other aspects and advantages of the disclosure will become apparent from the following descriptions taken in conjunction with the accompanying drawings that illustrate, by way of example, the principles of the described embodiments.

This Summary is provided merely for purposes of summarizing some example embodiments to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following description and figures.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
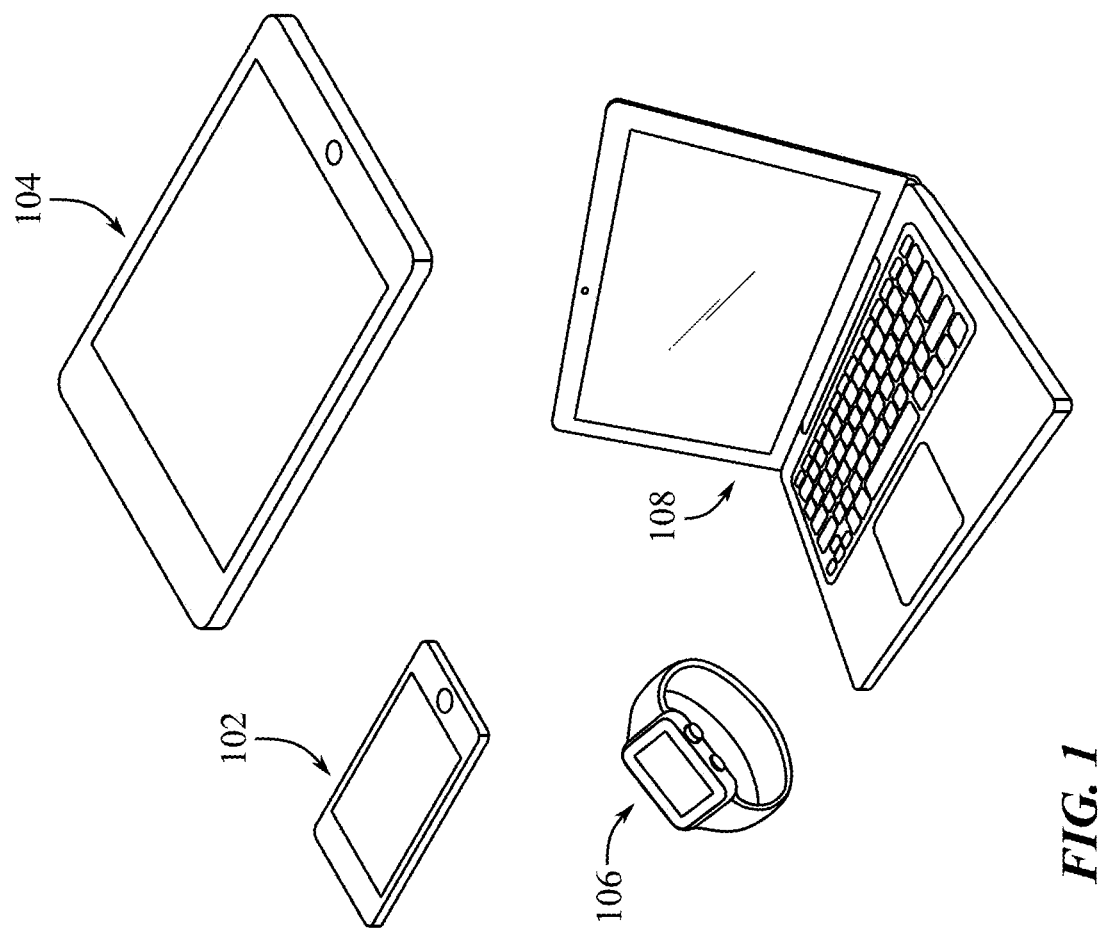
FIG. 1 illustrates perspective views of various electronic devices having metal surfaces that can be processed using the techniques described herein, in accordance with some embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a chemical treatment process that provides an effective means of improving the bonding of polymers to titanium surfaces. Titanium is an attractive metal for certain engineering applications due to its very high specific strength. For example, this allows strong but lightweight enclosures for portable electronic devices. In any such applications bonding to other materials such as polymers, glass, ceramics is necessary. In particular, injection-molded polymers can be used to electrically isolate various parts of an enclosure, whilst ideally maintaining structural strength. This paper includes a chemical process for producing a thin, rough, surface oxide on titanium, greatly improving the adhesion of polymers to the titanium.

In a particular embodiment, once the final geometry of the titanium surface has been prepared for adhesive bonding, the titanium can be optionally etched to raise its roughness. Unlike aluminum or steel, options for roughening are themselves limited, since titanium is not susceptible to many chemical etchants. After etching, a chemical process described in more detail below, a surface structure can be produced on the titanium or titanium alloy to which a structural polymer, such as glass-filled ABS, can be injection molded with a resulting bond strength similar to that achieved with steel and aluminum and also with a similarly low rate of air leakage rate through the bond in leak testing.

These and other embodiments are discussed below with reference to FIGS. 1-5. However, those skilled in the art will readily appreciate that the detailed description given herein with respect to these Figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Titanium is frequently cited as a material of choice for consumer-grade portable electronic devices. Titanium has desirable attributes such as high specific strength and stiffness, and is relatively easy to machine. Moreover, titanium may be anodized to yield a wide range of durable aesthetic finishes, which resist degradation due to everyday handling. Titanium may be used in combination with non-metal materials, such as glass and polymer. For instance, displays of portable electronic devices may be bonded to a titanium frame for the enclosure. The titanium frame is often subdivided into various electrically isolated parts such as to prevent electromagnetic interference of antenna(s) carried within the enclosure. For instance, titanium may be used to form a structural band around the edges of the enclosure such that the display is bonded to one face, and a glass is bound to the opposing face. Furthermore, electrical insulating splits may be formed about the perimeter of the enclosure.

In order for the structural band to impart the enclosure with sufficient structural strength, robustness, rigidity, and heat and moisture-resistance throughout its lifetime, the enclosure requires a strong adhesive bond to be formed between the metal (e.g., titanium) and the non-metal material (e.g., polymer). These requirements can be even more technically challenging to satisfy in the face of additional insulating splits (for improved antenna performance) and even smaller areas of adhesion (to minimize weight and space). Moreover, the increasing need for water resistant enclosures demands that these adhesive bonds must not only maintain strength, but also prevent moisture leakage even after the enclosure has been subjected to many strain cycles. Furthermore, it should be noted that conventional mechanisms for fastening metal to non-metal material such as mechanical fasteners (e.g., riveters) cannot be used in portable electronic devices due to the requirement of electrical isolation between metal parts. For example, non-metal material (e.g., polymer) is used to electrically isolate different metal parts that are attached together. Furthermore, alternatives such as micro-arc oxidation or by anodizing in fluoride-based electrolytes or caustic solutions yield generally poor adhesive performance. Indeed, these processes generate lightly scalloped structures that fail to provide the necessary attachment strength, water-resistance, and pull strength required for portable electronic devices to undergo consumer usage in harsh environments. As enclosures for portable electronic devices become smaller and/or the design of these enclosures changes to a mere peripheral band of metal, the area allowed for bonding between metal and non-metal is greatly reduced. Thus, there is an increased emphasis in more robust metal to non-metal bonding.

As used herein, the terms oxide coating, oxidized layer, oxide layer, oxide film, oxidized layer, porous oxide layer, and surface oxide layer can be used interchangeably and refer to any appropriate oxide layers. The oxide layers are formed on surfaces of a titanium substrate. The titanium substrate can include any of a number of suitable alloys. The type of titanium can include any number of examples, such as type Ti-6Al-4V (Ti6Al4V) alloy. In some embodiments, the non-metal layer can include a majority of non-metal materials that are mixed or in combination with metal materials such that the non-metal layer is largely comprised of non-metal materials. As used herein, the terms part, layer, segment, and section can also be used interchangeably where appropriate.

These and other embodiments are discussed below with reference to FIGS. 1-5. However, those skilled in the art will readily appreciate that the detailed description given herein with respect to these figures is for explanatory purposes only and should not be construed as limiting.

FIG. 1 illustrates various portable electronic devices that can be processed using the techniques described herein. The techniques as described herein can be used to process metallic surfaces (e.g., titanium oxide layers, etc.) of enclosures of portable devices for consumer usage. FIG. 1 illustrates a smartphone 102, a tablet computer 104, a smartwatch 106, and a portable computer 108. According to some embodiments, the metallic surfaces can refer to a metal substrate overlaid by a metal oxide layer. In some examples, the metal oxide layer can be formed from the metal substrate. In particular, the metal oxide layer can function as an additional protective coating to protect the metal substrate, for example, when these portable devices are dropped, scratched, chipped, or abraded.

According to some embodiments, a non-metal material can be attached to the external surface of the metallic surface. In particular, the multi-layer enclosures of these portable devices that include a combination of metal and non-metal materials can provide improved structural and electromagnetic interference reduction benefits to the functionality of these portable devices. In one example, these portable devices can include a wireless antenna/transceiver that is capable of receiving and transmitting data signals with other electronic devices. However, a metal surface that directly covers the wireless antenna can cause an amount of undesirable electromagnetic interference that can affect the ability of the portable device to receive and/or transmit these data signals. However, a non-metal material, such as a polymer is generally non-electrically conductive (i.e., dielectric), thus can minimize the amount of electromagnetic interference that affects the portable device while still imparting the enclosure of the portable device with a sufficient amount of structural rigidity and protective qualities.

Figure 2:
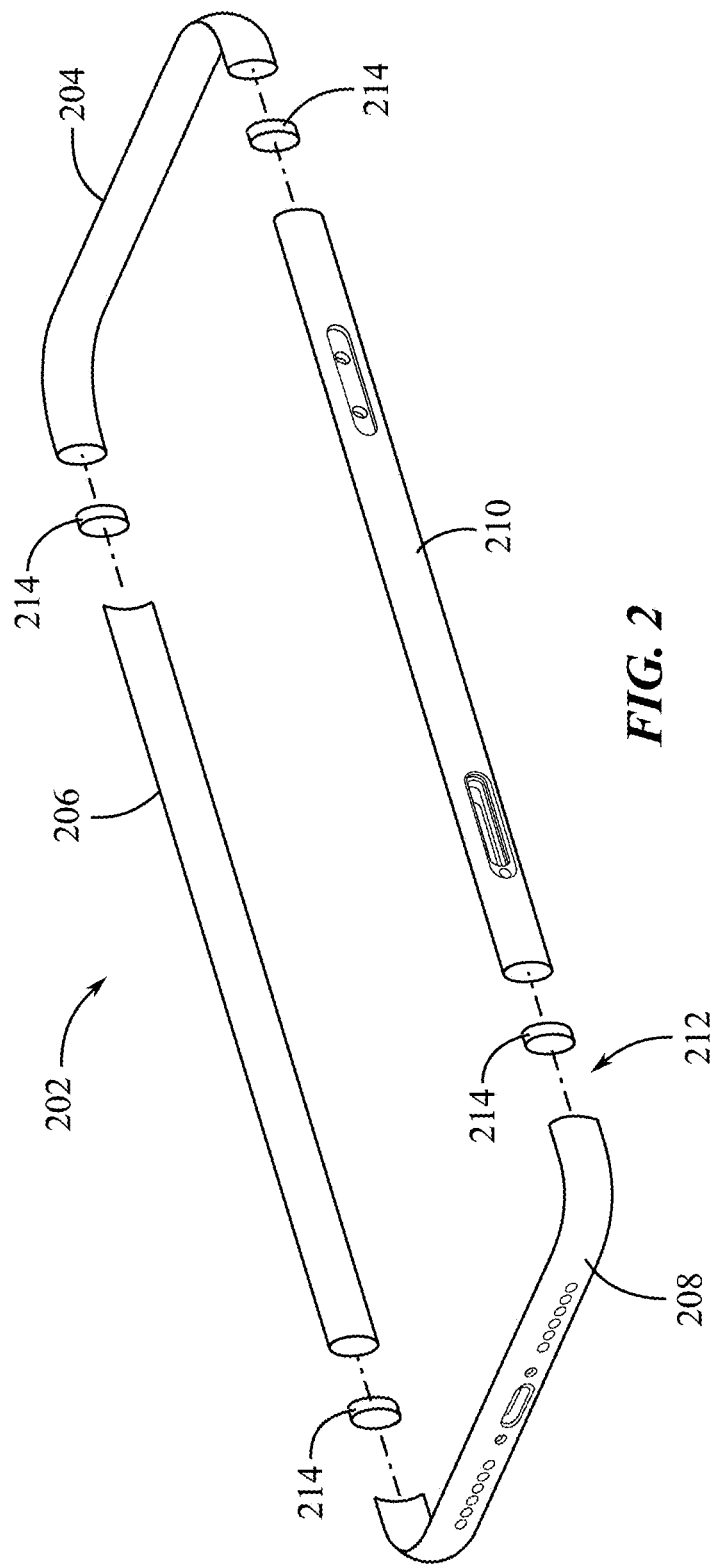
FIG. 2 illustrates an exploded view of a component of an electronic device.

FIG. 2 illustrates an exploded view of a band 202 that can form part of a housing or an enclosure of an electronic device such as electronic devices 102-108 described in FIG. 1. The band 202 can include one or more portions that are titanium or titanium alloy components, such as an exterior portion joined to an interior portion, as described herein. For example, the band 202 can include a first titanium sidewall component 204, a second titanium sidewall component 206, a third titanium sidewall component 208 (opposite the first composite sidewall component (204), and a fourth titanium sidewall component 210. In some examples, as described herein, the titanium components 204, 206, 208, 210 can be separated and/or joined together by a material that can include an electrically inert or insulated material, such as polymer and/or resin, as a non-limiting example.

Although the embodiment illustrated in FIG. 2 includes a band 202 having multiple titanium components 204, 206, 208, 210 that are joined together, in some embodiments, a housing or enclosure for an electronic device can include or be formed from a single titanium component having an interior and exterior portion, as described herein. Further, in some examples, the titanium components can form portions of the housing or enclosure other than the sidewalls, such as a top portion, bottom portion, or any portion of the housing or enclosure. The titanium components 204, 206, 208, 210 of the band 202 can be formed by a variety of processes and can allow for the band 202 to have a detailed shape or design that is tailored specifically to satisfy one or more needs, such as internal dimensional requirements, without the need for additional features to reinforce the structure of the band.

Openings, or split regions can separate adjacent titanium components of the band 202. For example, the sidewall component 208 is separated from the sidewall component 210 by an opening 212. The sidewall component 208 is separated from the sidewall component 206 by an additional opening. A non-metal spacer 214 can fill each of the openings. In some examples, the non-metal spacer 214 can include a polymer. The polymer can be at least one of an injection molded glass-filled PBT resin, a polyamide, and an epoxy. In some examples, the polymer can be bonded to the titanium component with titanium-polymer bonding operations. Further details of the titanium components and a method to improve the bonding strength of the titanium-polymer bond are provided below with reference to FIGS. 3A-5.

Figure 3A:
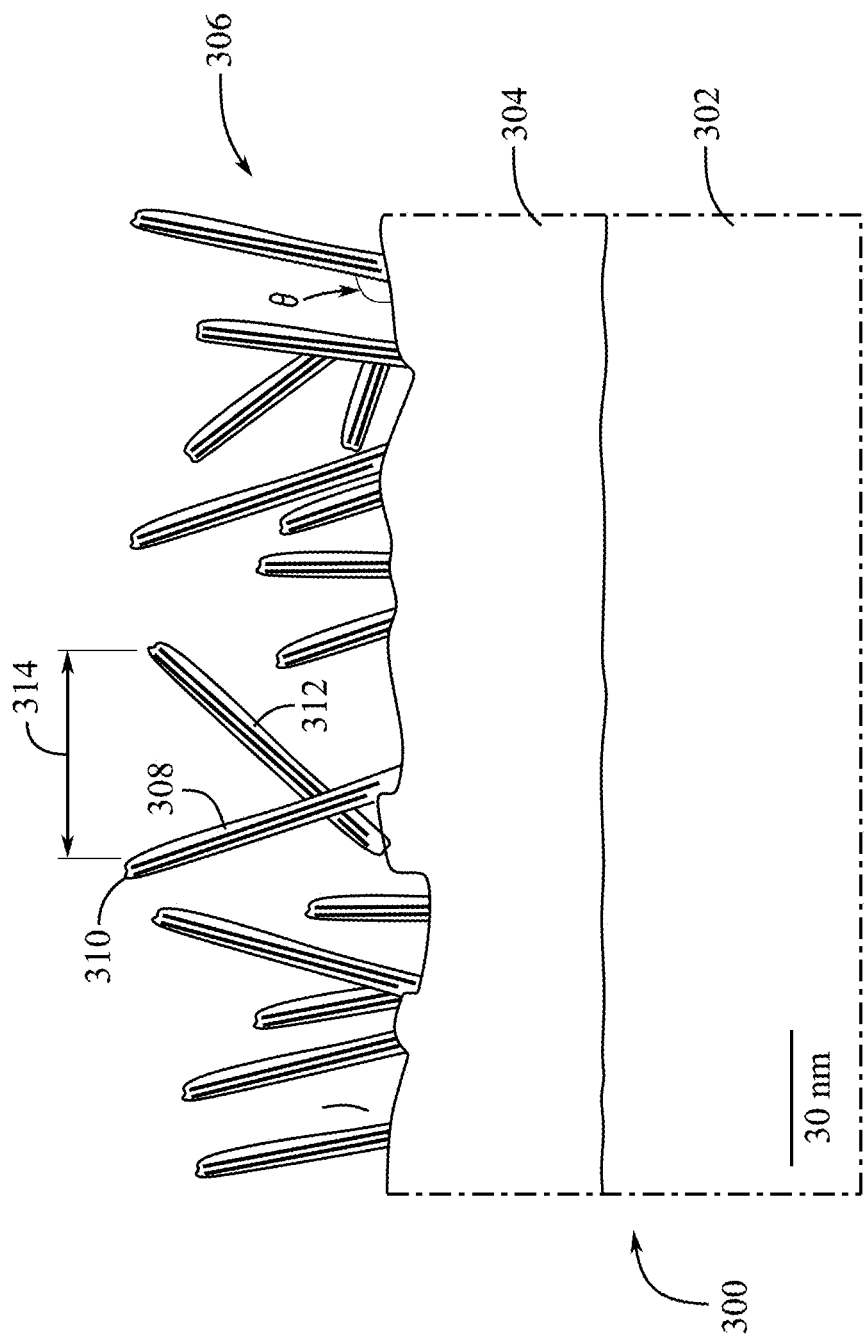
FIG. 3A illustrates a cross sectional view of a titanium surface including an oxide layer.

FIG. 3A illustrates a cross sectional view of a titanium surface 300. The titanium surface 300 includes a titanium substrate 302 and an oxide layer 304. The titanium substrate 302 can be a titanium alloy. In some examples, the oxide layer 304 can include a thickness greater than about 25 nm. In some embodiments, the oxide layer 304 can be about 30 nm in thickness or greater, about 40 nm in thickness or greater, about 50 nm in thickness or greater, about 60 nm in thickness or greater, about 70 nm in thickness or greater, about 80 nm in thickness or greater, or in thickness ranges of about 25 nm to about 35 nm, about 35 nm to about 50 nm, about 50 nm to about 60 nm, or about 60 nm to about 70 nm.

In some examples, the titanium surface includes a layered double hydroxide. Layered double hydroxides (LDHs) are ionic lamellar compounds consisting of positively charged layers and an interlayer region with charge-compensating anions. Layered double hydroxides generally consist of mixed metals (e.g. titanium alloys) and hydroxide molecules separated by exchangeable anions. In some examples, the oxide layer 304 can include a microstructure 306 having a plate 308. The plate 308 can include a layered double hydroxide.

In some examples, the plate 308 can be less than about 10 nm in thickness and about 10 to about 100 nm in length. In some embodiments, the plate 308 can be about 2 nm in thickness or greater, about 3 nm in thickness or greater, about 5 nm in thickness or greater, about 7 nm in thickness or greater, about 8 nm in thickness or greater, about 9 nm in thickness or greater, or in thickness ranges of about 1 nm to about 3 nm, about 3 nm to about 6 nm, about 6 nm to about 8 nm, or about 8 nm to about 10 nm.

In some embodiments, the oxide layer 304 can include a plate extending a length from the oxide layer 304 to a terminal end 310 of the plate 308. The length of the plate 308 can be about 10 nm or greater, about 20 nm or greater, about 30 nm or greater, about 40 nm or greater, about 50 nm or greater, about 60 nm or greater, about 70 nm or greater, about 80 nm or greater, about 90 nm or greater or in ranges of about 10 nm to about 20 nm, about 20 nm to about 30 nm, about 30 nm to about 40 nm, about 40 nm to about 50 nm, about 50 nm to about 60 nm, about 60 nm to about 70 nm, about 70 nm to about 80 nm, about 80 nm to about 90 nm, or about 90 nm to about 100 nm. In some examples, the plate 308 can include an angle θ greater than about 30° to the titanium surface 300. The plate can include an angle θ about 40° or greater, about 50° or greater, about 60° or greater, about 70° or greater, about 80° or greater or in ranges of about 30° to about 40°, about 40° to about 50°, about 50° to about 60°, about 60° to about 70°, about 70° to about 80°, or about 80° to about 90° to the titanium surface 300.

In some examples, the microstructure 306 extending from the oxide layer 304 can include a first plate 308 and a second plate 312. In some embodiments, the first plate 308 and the second plate 312 can extend independently from the oxide layer 304. In other embodiments, the first plate 308 and the second plate 312 can extend from about the same spatial location of the oxide layer 304, as shown in FIG. 3A. The first plate 308 and the second plate 312 can both include a terminal end 310. In some examples, the terminal ends 310 of the first plate 308 and the second plate 312 can be separated by a distance 314. The distance 314 can cause the oxide layer to form a porous structure or, in other words, a porous oxide layer. In some embodiments, a terminal end 310 of the first plate 308 can be a distance of between about 20 nm to about 80 nm to a terminal end 310 of the second plate 312. The distance 314 can be about 20 nm or greater, about 30 nm or greater, about 40 nm or greater, about 50 nm or greater, about 60 nm or greater, about 70 nm or greater, about 80 nm or greater or in ranges of about 20 nm to about 30 nm, about 30 nm to about 40 nm, about 40 nm to about 50 nm, about 50 nm to about 60 nm, about 60 nm to about 70 nm, or about 70 nm to about 80 nm. As explained below, the porous structure of the oxide layer 304 created by at least the first plate 308 and the second plate 312 can create an interlocking structure with a non-metal material (e.g. polymer) when the non-metal material flows into the porous structure and is allowed to harden and transform from a melted state into a solid state.

Figure 3D:
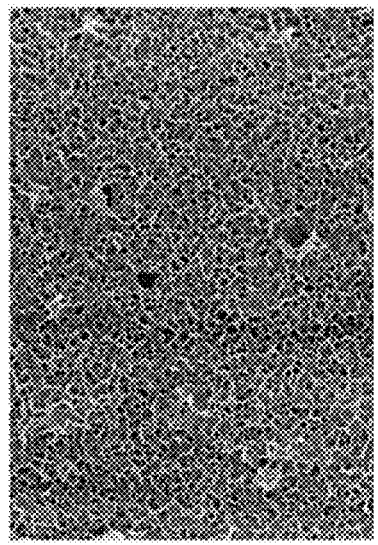
FIGS. 3B-3D illustrate exemplary images of views of a titanium surface having an oxide layer developed using the techniques described herein, in accordance with some embodiments.
Figure 3C:
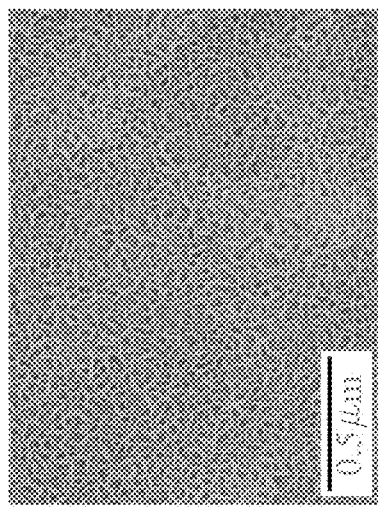
Figure 3B:
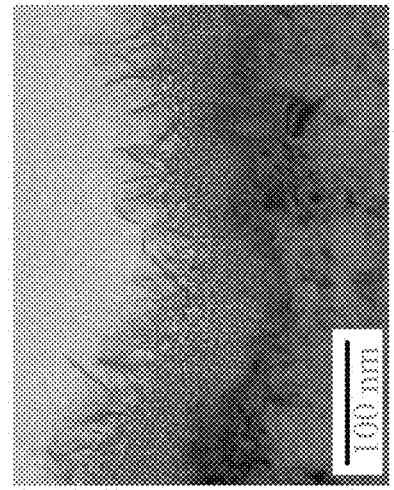

FIGS. 3B-3D illustrate exemplary microscopic images of an example titanium surface with a layered double hydroxide similar to that illustrated in FIG. 3A as titanium substrate 302 and an oxide layer 304 having a layered double hydroxide as a plate 308 extending from the oxide layer 304, in accordance with some embodiments. FIG. 3B illustrates a cross-sectional view, where the oxide layer 304 exhibits the layered double hydroxide. As shown in FIG. 3B, plates extend from the oxide layer and have different angles from about 30° to about 90° to the titanium surface. The terminal ends of the plates have respective distances between them forming pores because the terminal ends are separated by a distance of about 20 nm to about 80 nm. FIG. 3C illustrates a top view of a region of an oxide layer formed on an external surface of an example titanium substrate. In particular, FIG. 3C illustrates the arrangement of a multitude of plates extending from an oxide layer, the multitude of plates having distances between the terminal ends of the plates that define openings that form a porous structure. FIG. 3D also illustrates the arrangement of a multitude of plates extending from an oxide layer. However, FIG. 3D illustrates more clearly that a porous structure formed in an oxide layer can exhibit pores having a range of sizes, where the distances from the terminal ends of the plate can be up to about 50 nm. In some embodiments, the oxide layer can include a porosity between about 30% and about 80%. In some embodiments, the oxide layer can include a porosity of about 50%. In some embodiments, the porosity of the oxide layer can be 30% or greater, such as about 40% or greater, about 50% or greater, about 60% or greater, about 65% or greater, about 70% or greater, or in ranges of about 30% to about 40%, about 40% to about 50%, about 50% to about 60%, about 60% to about 70%, or about 70% to about 80%. In some embodiments, the oxide layer (e.g. oxide layer 304) can include a porous structure wherein a pore of the porous structure includes a diameter from about 20 to about 80 nm. In some examples, the porosity of an oxide layer can be adjusted according to the method of forming a layered double hydroxide film layer on a titanium surface.

Figure 4A:
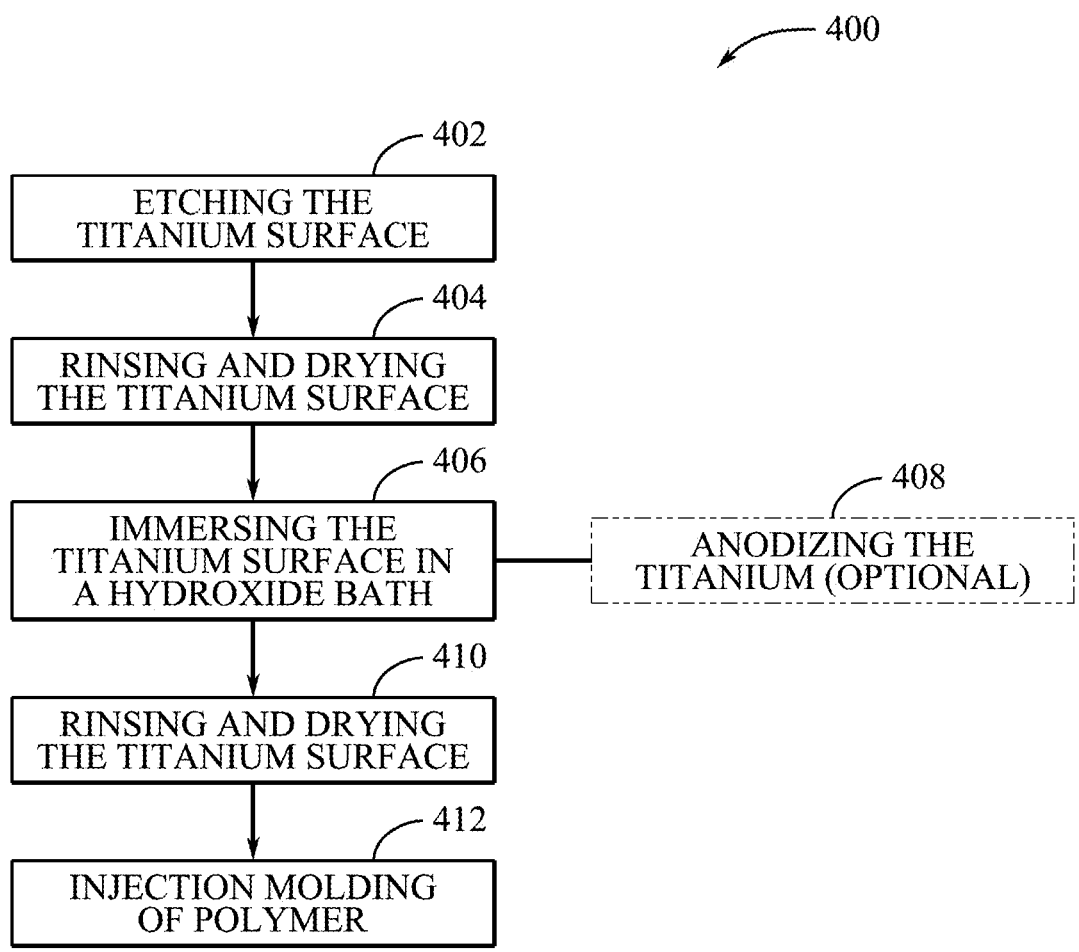
FIG. 4A illustrates a method of forming a layered double hydroxide film layer on a titanium surface, according to some embodiments.

FIG. 4A illustrates a method 400 for forming a layered double hydroxide film layer on a titanium surface, according to some embodiments. As illustrated in FIG. 4A, the method 400 can optionally begin at block 402, where a titanium surface can be etched to provide a roughening effect. In some examples, prior to roughening the surface of the titanium, the substrate can be degreased and rinsed. After rinsing, the titanium surface can be dried in preparation for etching. In some examples, etching the titanium surface can include immersing the titanium surface in sulfuric acid. Unlike aluminum or steel, options for roughening are themselves limited, since titanium is not susceptible to many chemical etchants. However, sulfuric acid provides a useful roughening effect. In particular, the etching surface can be beneficial in providing a roughed external surface of the titanium substrate that can promote growth of the titanium oxide layer at the roughened regions.

Figure 4B:
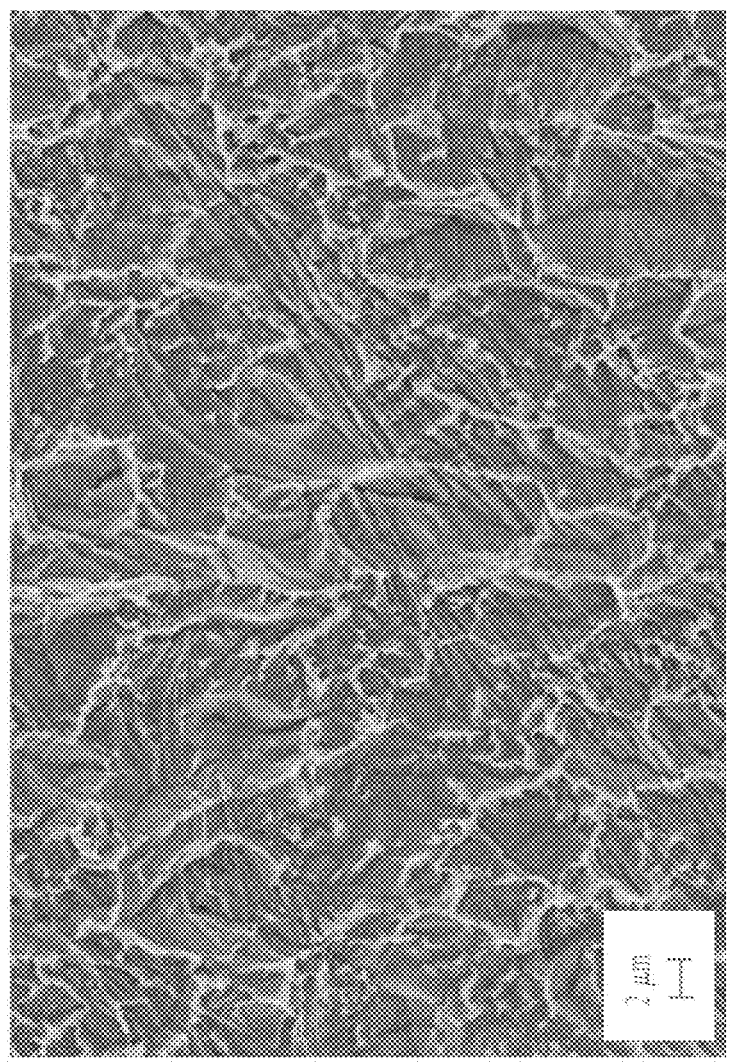
FIG. 4B illustrates an exemplary image of a view of an etched titanium surface developed using the techniques described herein, in accordance with some embodiments.

Referring now to FIG. 4B, the titanium may be chemically etched to raise its roughness. FIG. 4B illustrates an exemplary microscopic images of a titanium substrate after it has been etched by sulfuric acid. In some examples, the sulfuric acid etching process can contribute up to about 15% bond strength between the titanium oxide and the non-metal material. In other embodiments, the sulfuric acid etching process can be omitted and/or replaced with other physical or chemical roughening pre-treatments. In some embodiments, the etching process can include a peak to valley roughness of greater than about 20 microns. In some embodiments, the etching process can raise the difference in height of each point on the surface from less than about 1 μm to greater than about 4 μm compared to the arithmetical mean of the surface. In some embodiments, the percentage of the additional surface area contributed by the texture of the surface as compared to the planar definition area can include between about 5% and about 13%.

In an example, computer numerical control (CNC) machining can be used to prepare the roughened surface. In some embodiments, structural designs to improve bonding between the titanium surface and the non-metal material can include macroscopic features (e.g. mechanical interlocks) that may provide mechanical keying between the non-metal material (e.g. polymer) and the titanium, as well as to maximize the surface area for titanium polymer bonding and to offer various interface orientations to optimize strength and robustness of the joint for expected failure modes. Any etching or inclusion of features to improve the bonding can also help maximize the length and convolutedness of any potential air or water leakage paths and provide a stronger bond for air and water leakage resistance.

Referring back to FIG. 4A, at block 404, the titanium surface can be rinsed and dried after being removed from the sulfuric acid. In some examples, prior to immersing the titanium surface in a hydroxide bath, the etched titanium surface can be subjected to a two-stage counter-flowed rinse in order to remove the etching solution. In some examples, the external surface of the titanium substrate can be cleaned to remove any liquid or contaminants that may be present to further promote formation of an oxide layer over the titanium substrate. For example, the external surface of the titanium substrate can be cleaned and rinsed with tap water or deionized water in order to remove any remnants of the sulfuric acid. In an embodiment where the titanium surface is not etched, the surface can be simply cleaned and prepared prior to immersing the titanium surface in a hydroxide bath.

At block 406, the titanium surface can be immersed in a hydroxide bath. The bath can include a pH from about 12 to about 14 and a temperature from about 25° C. to about 125°

C. in some examples. The hydroxide can include at least one of sodium hydroxide, calcium hydroxide, and potassium hydroxide. The hydroxide oxidizes the titanium, which generates a relatively thin and well-adhered surface oxide. In some embodiments, the hydroxide simultaneously attaches the oxide as it is formed, etching and roughening the oxide layer to form a fine-scale roughness and porosity that includes the layered double hydroxide plates. The porosity enhances the adhesion of injection-molded polymers to the oxide surface.

At block 408, the titanium surface can optionally be anodized while immersed in the hydroxide. In some examples, a positive potential can be applied to the titanium substrate to promote oxide growth. A titanium or carbon counter-electrode can be utilized. In an example, anodizing the titanium surface can include applying a 15V potential to the titanium surface. In some embodiments, the anodization in addition to the hydroxide bath can form a thicker and/or more porous oxide than without the anodization.

At block 410, the titanium surface can be rinsed and dried. Similar to block 404 discussed above, the external surface of the titanium substrate can be cleaned to remove any liquid or contaminants that may be present to improve bond strength between the oxide layer and the non-metal material (e.g. polymer). At block 412, the method 400 can include the injection molding of polymer. In an example, a structural polymer such as glass-filled ABS can be injection molded with a resulting bond strength of approximately 28 MPa. As discussed above, with reference to FIG. 3A, after forming the oxide layer including the layered double hydroxide, a metal oxide layer may include pores that can be filled with a non-metal material. For example, the non-metal material can refer to a polymer material, such as polyethylene terephthalate ("PET"), polyaryletherketone ("PAEK"), polyether ether ketone ("PEEK"), an injection molded glass-filled PBT resin, a polyamide, and/or an epoxy that while in a melted or liquid state can be allowed to flow into the pores and/or the distances between the terminal ends of the plates of the oxide layer. In some examples, the polymer can have any amount of viscosity or surface tension that is sufficient to attach to the oxide layer of the titanium surface. In some examples, the titanium-polymer interface includes a polymer comprising a viscosity from about 100 cps to about $1\times10^6$ cps. In some embodiments, the polymer viscosity can be about $8\times10^4$ cps. In some embodiments, the polymer viscosity can be about 100 cps or greater, such as about 500 cps or greater, about 1000 cps or greater, about 5000 cps or greater, about $1\times10^5$ cps or greater, about $1.5\times10^5$ cps or greater, or in ranges of about 100 cps to about 1000 cps, about 1000 cps to about 5000 cps, about 5000 cps to about $1\times10^5$ cps, about $1\times10^5$ cps to about $1.5\times10^5$ cps or about $1.5\times10^5$ cps to about $1\times10^6$ cps. When the polymer material flows into the distances between the plates and the porous oxide structure, the polymer can penetrate past the double layer hydroxide and fill the voids within the oxide structure. After flowing into the porous oxide, the polymer can be allowed to harden. Thereafter, the polymer can transition from the liquid state into a solid state. Upon changing into the solid state, the polymer can be physically attached and bonded to the oxide layer.

In some examples, the polymer can include at least one of an injection molded glass-filled PBT resin, a polyamide, and an epoxy. In some examples, the titanium surface can be treated with etching in a sulfuric acid solution. In some examples, the oxide layer and the polymer form a titanium-polymer bond comprising a bond strength of about 28 MPa or greater. Generally, any failure in pull testing include cohesive failures within the glass-reinforced structural polymer, not adhesive failures between the polymer and the oxide layer or between the titanium substrate and the oxide layer as can be observed in other titanium surface treatments such as micro arc oxidation (MAO), caustic anodizing, or fluoride-based anodizing to generate porous titanium structures.

Figure 5:
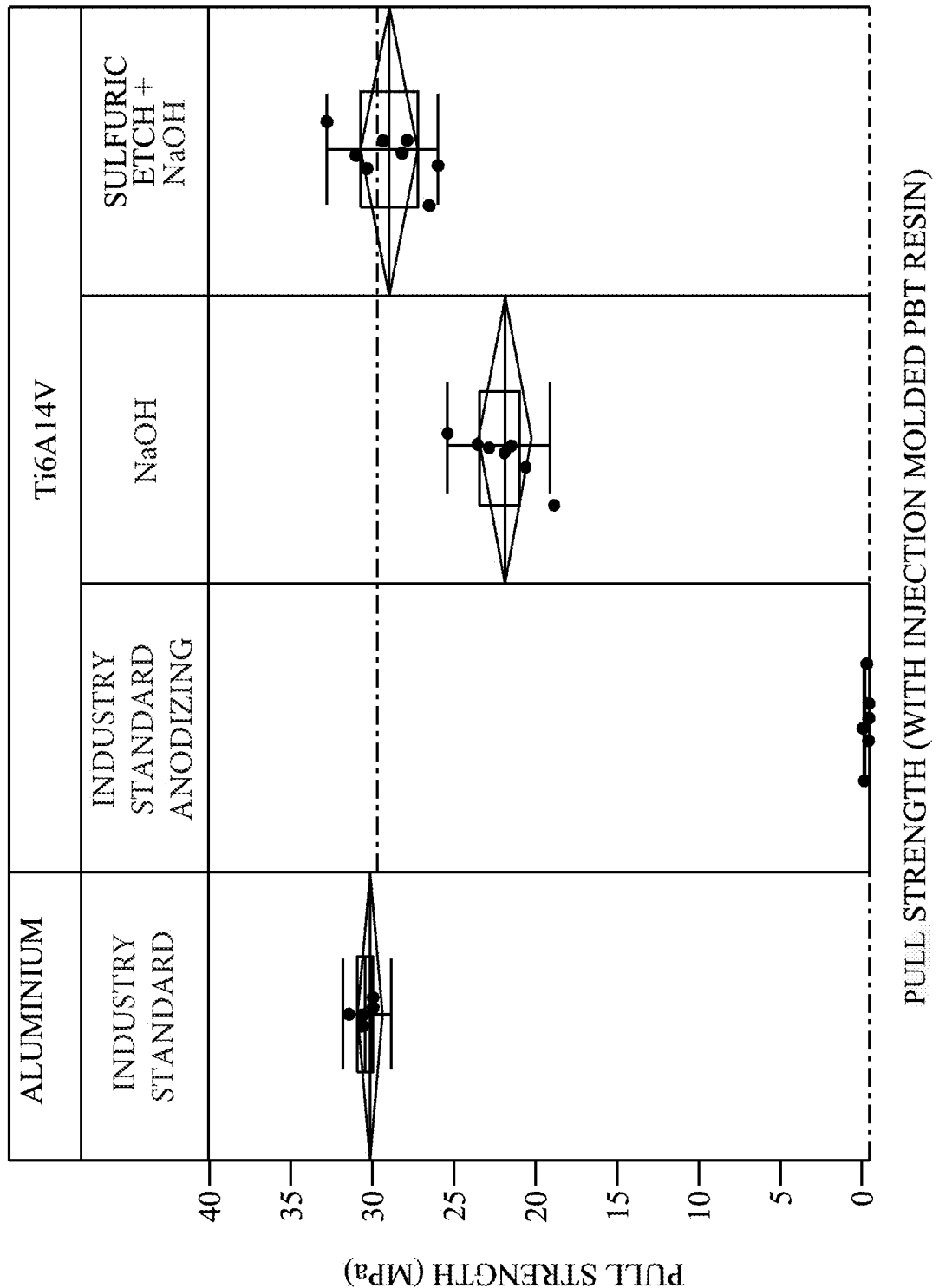
FIG. 5 illustrates a graph indicating a relationship between anodization treatment processes and pull strength of a treated metal part, in accordance with some examples.

FIG. 5 illustrates a graph indicating a relationship of pull strength as a function of the type of processing of a titanium alloy (Ti6Al4V) substrate compared to a relationship of pull strength as a function of the type of processing of an aluminum. In the exemplary trials, metal parts from different processes were attached at a 7 mm by 7 mm surface to a non-metal layer and were individually tested for pull strength. The non-metal layer included a glass-filled Polybutylene Terephthalate (PBT) surface. The different metal parts include an aluminum part and a titanium alloy (Ti6Al4V). The aluminum parts included state-of-the art and/or industry standard adhesive boding pre-treatment for a polymer-aluminum bond. The pre-treatment can include surface etching and anodization. In the exemplary trials, the aluminum parts exhibited a pull strength of about 30 MPa. The titanium alloy (Ti6Al4V) was treated with three different processes. First, the parts were anodized, in an example using a fluoride and sodium hydroxide solution. The anodized titanium parts exhibited a poor pull strength. The pull strength was less than 2 MPa. In another example, a titanium alloy (Ti6Al4V) part was immersed in sodium hydroxide (NaOH). In some embodiments, the NaOH roughens the oxide to provide the layered double hydroxide having surface roughness and porosity. The titanium alloy (Ti6Al4V) part exhibited a pull strength of between about 18 MPa and about 25 MPa. In another example, the titanium alloy (Ti6Al4V) part was etched in a sulfuric acid as described in block 402 of FIG. 4A and then immersed in the NaOH. The titanium alloy (Ti6Al4V) part exhibited a pull strength of between about 25 MPa and about 32 MPa, which is comparable to the aluminum parts and significantly stronger than previously used titanium bonding methods.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An oxide layer on a titanium surface comprising a layered double hydroxide, wherein the titanium surface comprises a non-uniform microstructure including a plate having an angle from about 30° to about 70° relative to the titanium surface.

2. The oxide layer of claim 1, wherein the titanium surface comprises a titanium alloy.

3. The oxide layer of claim 1, wherein the oxide layer comprises a thickness of about 30 nm to about 70 nm.

4. The oxide layer of claim 1, wherein the oxide layer comprises a porosity between about 30% and about 80%.

5. The oxide layer of claim 1, wherein the plate comprises less than about 10 nm in thickness and about 10 to about 100 nm in length.

6. The oxide layer of claim 1, wherein:
the plate comprises a first plate and the oxide layer further comprises a second plate; and
a terminal end of the first plate is a distance of between about 20 nm to about 80 nm from a terminal end of the second plate.

7. The oxide layer of claim 1, wherein the oxide layer further comprises a porous structure defining a pore having a diameter from about 20 to about 50 nm.

* * * * *